(12) United States Patent
Hines

(10) Patent No.: US 7,874,678 B2
(45) Date of Patent: Jan. 25, 2011

(54) PROJECTED AUTOSTEREOSCOPIC LENTICULAR 3-D SYSTEM

(76) Inventor: Stephen P. Hines, 1540 Wabasso Way, Glendale, CA (US) 91208

( * ) Notice: Subject to any disclaimer, the term of this patent is extended or adjusted under 35 U.S.C. 154(b) by 358 days.

(21) Appl. No.: 12/217,151

(22) Filed: Jul. 2, 2008

(65) Prior Publication Data
US 2010/0002193 A1 Jan. 7, 2010

(51) Int. Cl.
G03B 21/00 (2006.01)
G03B 21/60 (2006.01)
G02B 27/22 (2006.01)
H04N 13/04 (2006.01)

(52) U.S. Cl. ............ 353/7; 353/121; 359/458; 359/466; 348/51

(58) Field of Classification Search ............ 353/7, 353/121; 359/458, 462, 466; 348/42, 51
See application file for complete search history.

(56) References Cited

U.S. PATENT DOCUMENTS

| | | | |
|---|---|---|---|
| 2,131,974 A * | 10/1938 | Saint Genies | ............ 359/458 |
| 2,362,573 A | 11/1944 | MacNeille | |
| 2,889,739 A * | 6/1959 | Moore | ............ 353/7 |
| 3,180,214 A | 4/1965 | Fox | |
| 3,447,438 A | 6/1969 | Kaufer | |
| 3,712,708 A | 1/1973 | Brown | |
| 3,992,206 A | 11/1976 | Lamberts | |
| 4,089,587 A | 5/1978 | Schudel | |
| 4,232,939 A | 11/1980 | Kikuchi | |
| 4,674,853 A | 6/1987 | Street | |
| 4,767,186 A | 8/1988 | Bradley, Jr. et al. | |
| 4,911,529 A | 3/1990 | Van De Ven | |
| 4,964,695 A | 10/1990 | Bradley, Jr. | |
| 5,096,278 A | 3/1992 | Yoshioka et al. | |
| 5,192,969 A | 3/1993 | Igarashi et al. | |
| 5,838,494 A | 11/1998 | Araki | |
| 6,421,174 B1 * | 7/2002 | Ooshima et al. | ............ 359/457 |
| 6,469,830 B1 | 10/2002 | Dubin et al. | |
| 7,136,090 B1 * | 11/2006 | White | ............ 348/14.16 |
| 7,139,123 B2 | 11/2006 | Chubachi et al. | |
| 7,180,663 B2 | 2/2007 | Collender et al. | |
| 7,324,276 B2 | 1/2008 | Wood | |
| 2006/0256302 A1 | 11/2006 | Hsu | |
| 2007/0146876 A1 | 6/2007 | Peterson et al. | |
| 2007/0236791 A1 | 10/2007 | Makida et al. | |

* cited by examiner

Primary Examiner—Georgia Y Epps
Assistant Examiner—Magda Cruz
(74) Attorney, Agent, or Firm—Roy L. Anderson; Wagner, Anderson & Bright, P.C.

(57) ABSTRACT

An autostereoscopic 3-D image is provided in a viewing zone without the need for 3-D glasses by use of one or more projectors that project two or more images having projected exit pupils separated horizontally by no more than an average human interocular spacing onto a 3-D forming screen (which is a lenticular or a raster barrier screen) with a substantially smooth and nominally white back projection surface and a front side with multiple individual vertical elements that project left and right images so that the 3-D forming screen retro-reflects projected light on the screen received from a light source back to the light source.

18 Claims, 15 Drawing Sheets

PROJECTED AUTOSTEREOSCOPIC LENTICULAR 3-D SYSTEM

FIELD OF THE INVENTION

The present invention is in the field of three-dimensional images.

BACKGROUND OF THE INVENTION

Large screen video displays have become so commonplace in retail and entertainment settings to attract the attention of customers and passers by that their advertising value is diminished. Proposed here is a technique to provide a large 3-D video image without requiring 3-D glasses, therefore being auto-stereoscopic.

SUMMARY OF THE INVENTION

The present invention is generally directed to an apparatus and method in which a three-dimensional ("3-D") image is provided in a viewing zone without the need for 3-D glasses by use of one or more projectors that project two or more images having projected exit pupils separated horizontally by no more than an average human interocular spacing onto a 3-D forming screen with a substantially smooth and nominally white back side and a front side with multiple individual vertical elements that project left and right images so that the 3-D forming screen retro-reflects projected light on the screen received from a light source back to the light source.

In a first, separate group of aspects of the present invention, the 3-D forming screen can be a raster barrier screen (in which case its vertical elements are alternating clear and opaque black vertical stripes) or a lenticular screen (in which case its vertical elements are lenticules) while the projector(s) are oriented so that the images (which can be video images) are projected from sufficiently above or below the 3-D forming screen so that reflections of the projector on the 3-D forming screen do not reflect into the viewing zone and the 3-D forming screen is shifted vertically so that projector-highlight lines drawn from a position of a preselected tallest viewer's eyes to a reflected position of a projector as if reflected behind the 3-D forming screen does not intersect the 3-D forming screen.

In a second, separate group of aspects of the present invention, two or more projectors are used for projecting additional images having projected exit pupils separated horizontally by no more than the average human interocular spacing (or having an optically equivalent such distance through use of one or more mirrors) and at least one of these projectors projects from a position vertically off axis of the 3-D forming screen with a keystone correction (which may be optical and/or digital). Use of additional projectors provide additional parallax and realism in the viewing zone and retro-reflection from the 3-D forming screen forms tall system exit pupils from which the projected images are visible across the entire 3-D forming screen. Also, at least two additional adjacent viewing zones can provide the 3-D image due to reflections from adjacent vertical elements.

In a third, separate group of aspects of the present invention, a 3-D image is viewed from within the viewing zone while the two or more images are being projected upon the 3-D forming screen and the viewing zone is the same distance as the projector from the 3-D forming screen unless one or more mirrors are used to create the same optically equivalent distance.

In a fourth, separate group of aspects of the present invention, multiple images are projected from far enough above or below a front side of a 3-D forming screen so that the reflection, from a point of view of an observer, does not fall within a picture area.

In a fifth, separate group of aspects of the present invention, horizontal image resolution is controlled by selecting a pitch of a lenticular screen for a chosen application to be smaller than will be discernable by a viewer while projecting multiple images onto the lenticular screen which are retro-reflected to provide the 3-D image in a viewing zone.

In a sixth, separate group of aspects of the present invention, lenticular distortion in the 3-D picture is avoided by front projecting two or more images onto a lenticular screen which are retro-reflected to provide the 3-D image in a viewing zone at the same distance as the projector(s) from the lenticular screen.

Accordingly, it is a primary object of the present invention to provide a novel method and apparatus for providing a 3-D picture in a viewing zone.

This and further objects and advantages will be apparent to those skilled in the art in connection with the drawings and the detailed description of the preferred embodiment set forth below.

BRIEF DESCRIPTION OF THE DRAWINGS

FIG. 4 also shows the lower portion of the enclosure housing a product turntable, lights and video cameras which supply images to the video projectors above.

FIG. 5 also shows the lights, turntable and video cameras.

DETAILED DESCRIPTION OF THE INVENTION

The present invention is generally directed to projecting two or more images onto a screen that retro-reflects projected light back to the source to form a three-dimensional ("3-D") viewing zone.

The present invention will now be discussed in connection with several preferred embodiments illustrated in the Figures.

In the Figures and the following more detailed description, letter designations indicate various features relating to the invention, with like letter designations referring to like features throughout both the drawings and the description. Although the Figures are described in greater detail below, the following is a glossary of the elements identified in the Figures.

Figure 1:
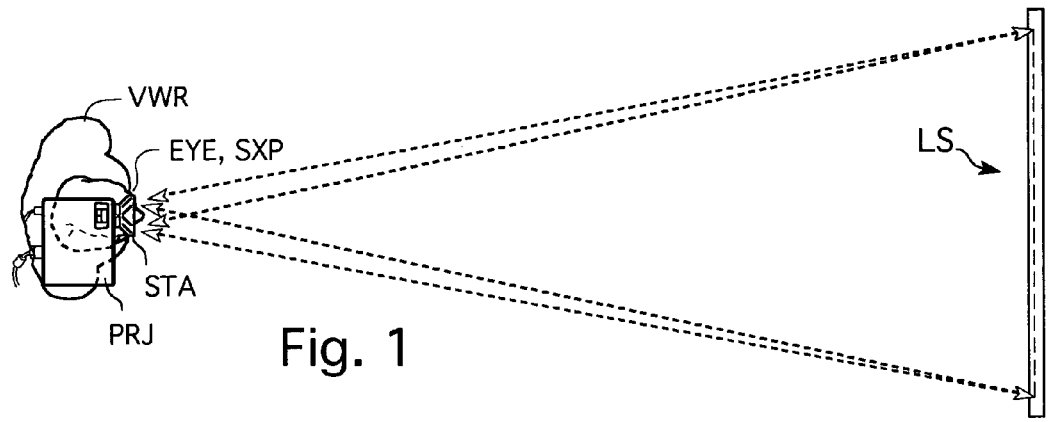
FIG. 1 is a top view of the most basic version of a projected 3-D system according to the present invention, showing a viewer standing under the stereoscopic attachment on a single video projector.
Figure 2:
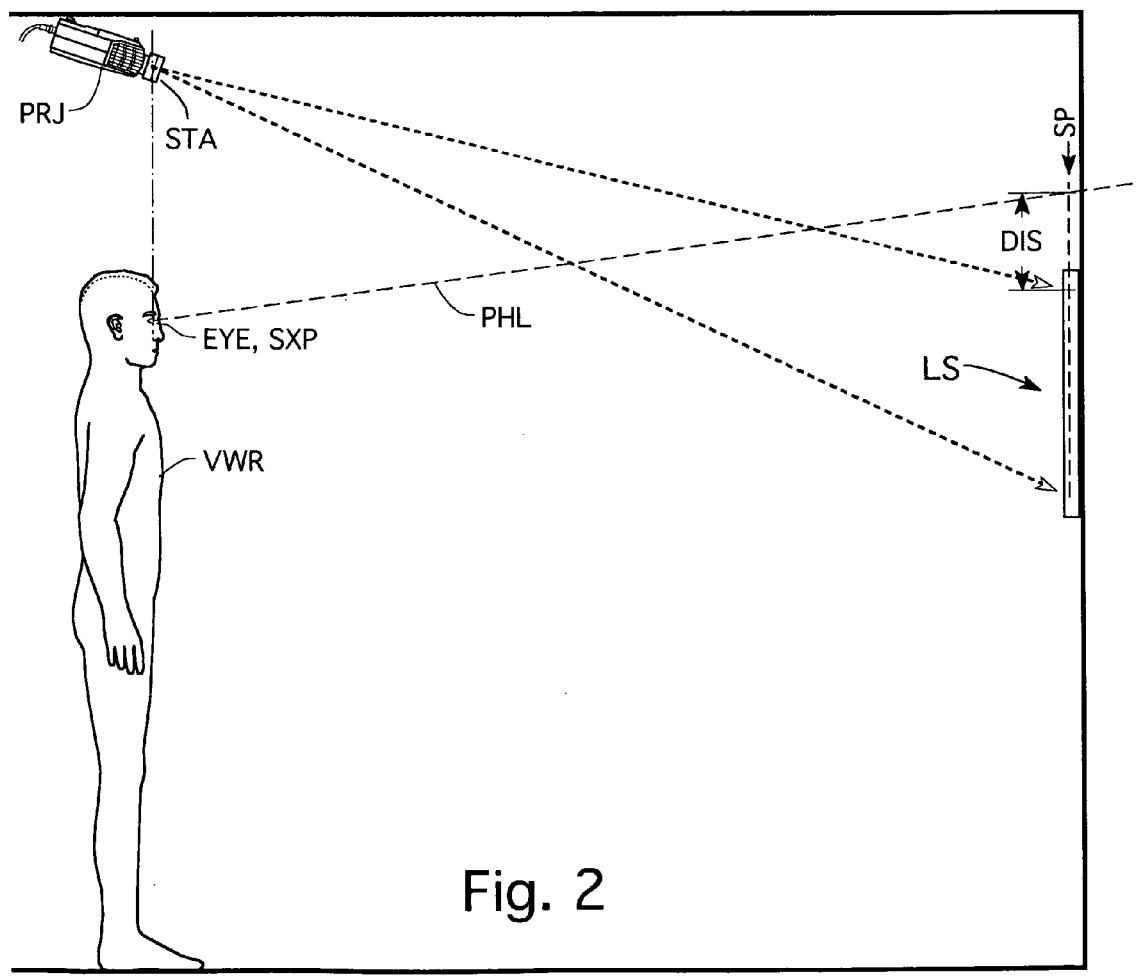
FIG. 2 is a side view of FIG. 1, showing the viewer standing under the stereo adapter on the ceiling-mounted video projector.
Figure 3:
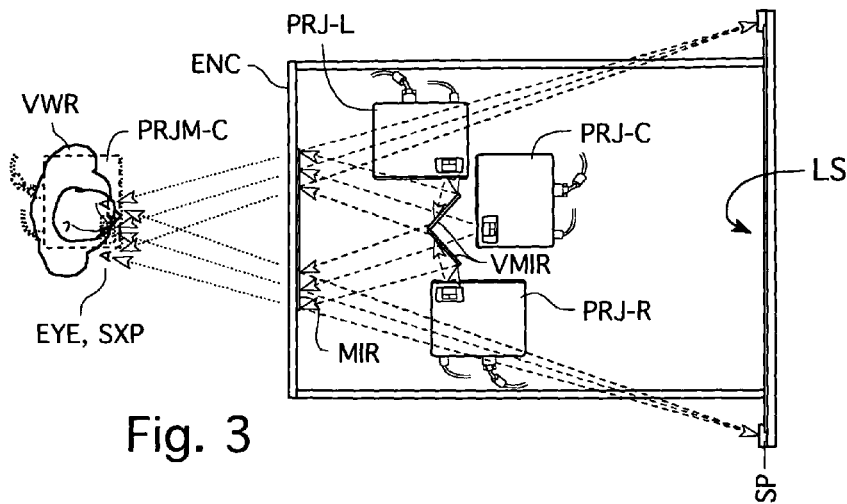
FIG. 3 is a top view of a viewer standing in front of a retail advertising display which houses three video projectors according to the present invention. Mirrors allow the projectors to be at the optically equivalent distance from the screen as the viewer.
Figure 4:
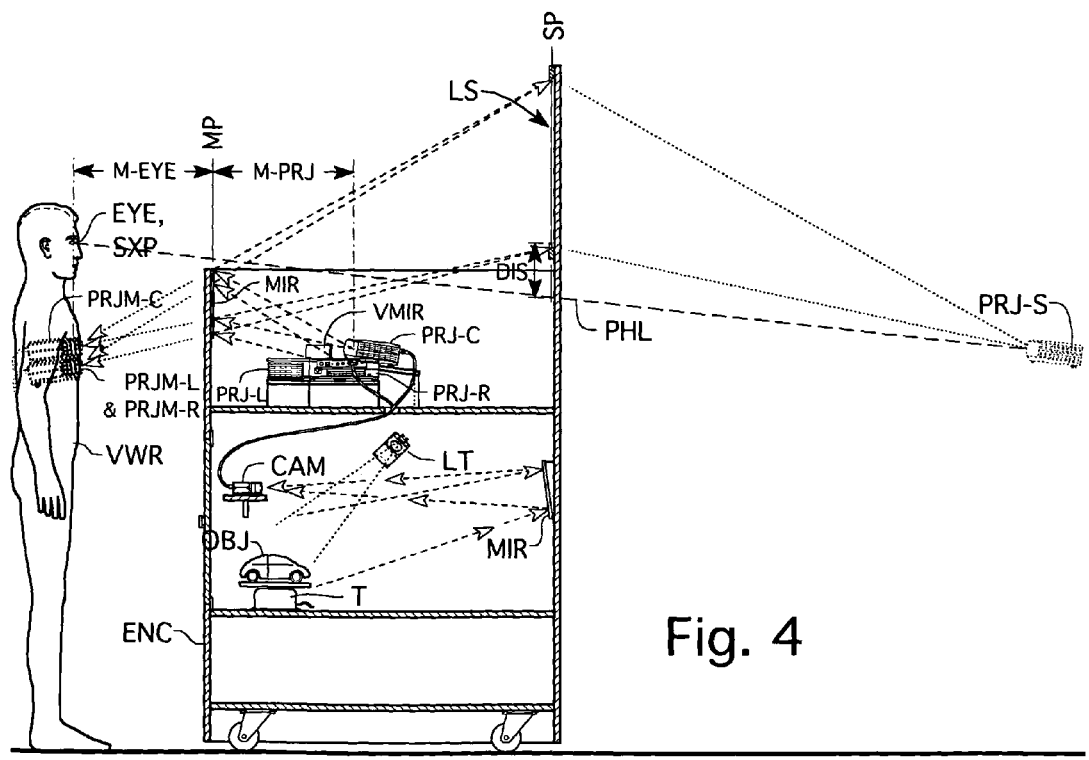
FIG. 4 is a side view of the retail advertising display of FIG. 3, showing the viewer's eyes being at the optically equivalent distance of the three projectors.
Figure 5:
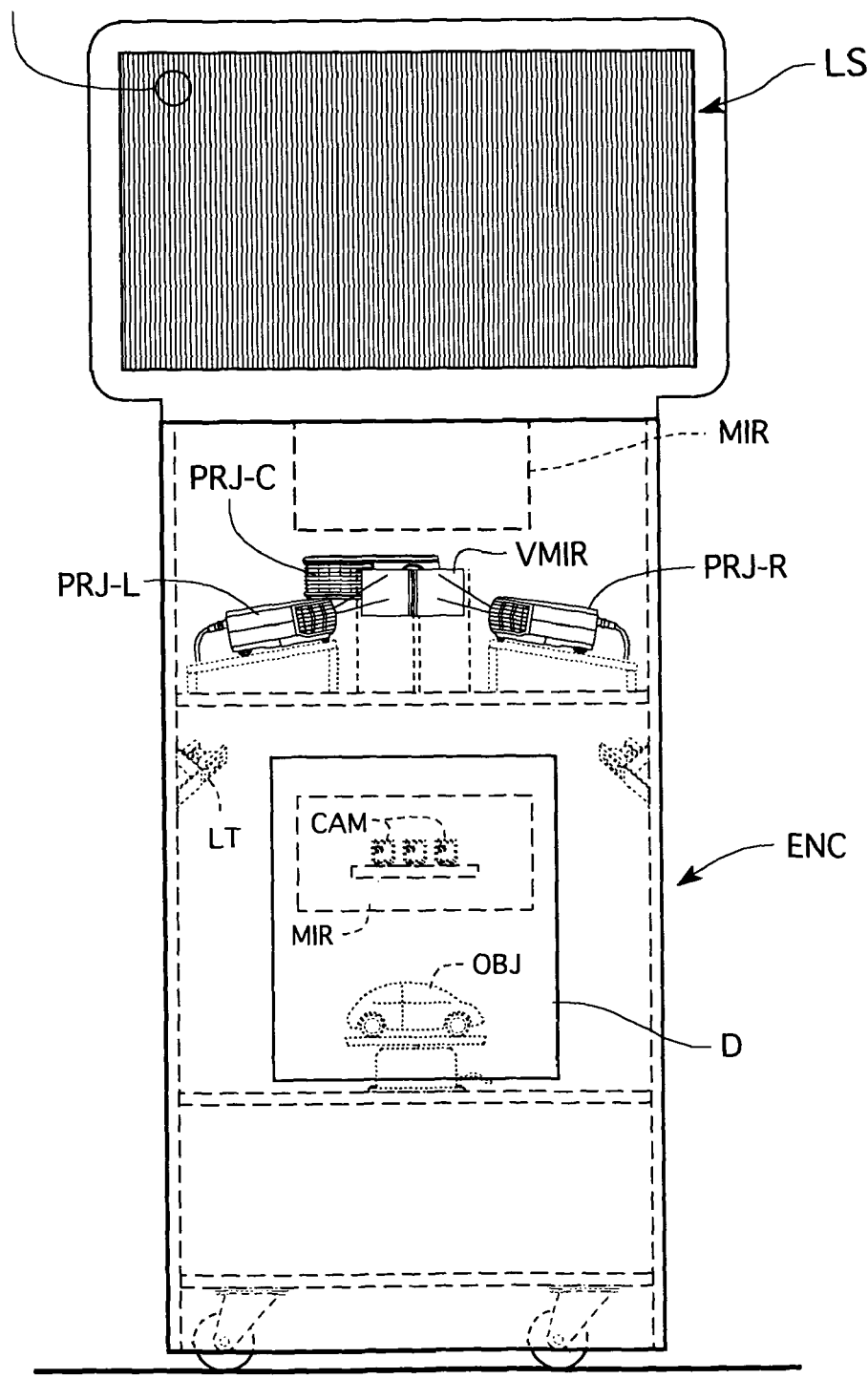
FIG. 5 is a front view of the retail advertising display of FIGS. 3 and 4.
Figure 6:
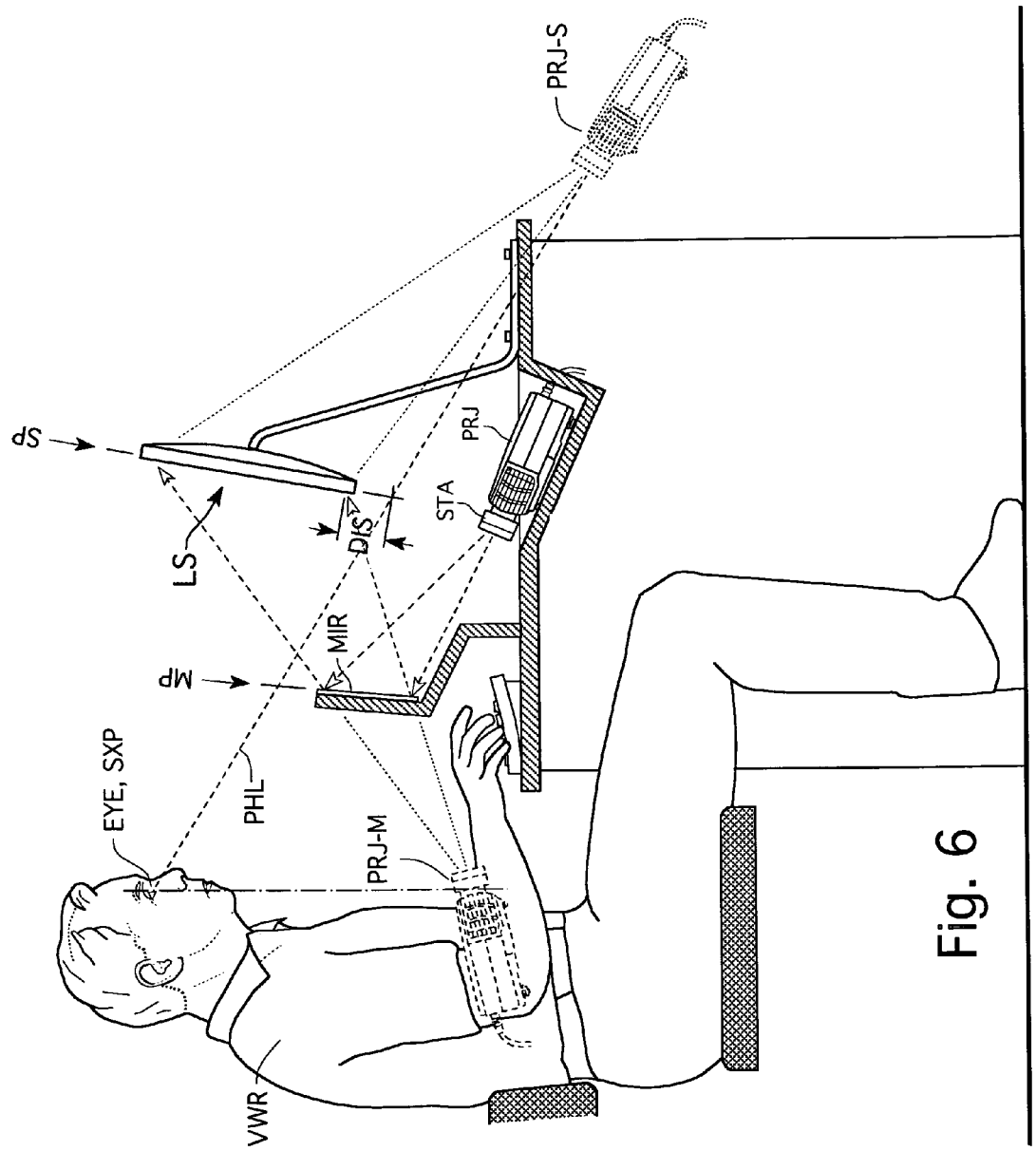
FIG. 6 is the side view of a 3-D computer terminal, and a mirror which causes the projector(s) to be at the optically equivalent distance of the viewer.
Figure 7:
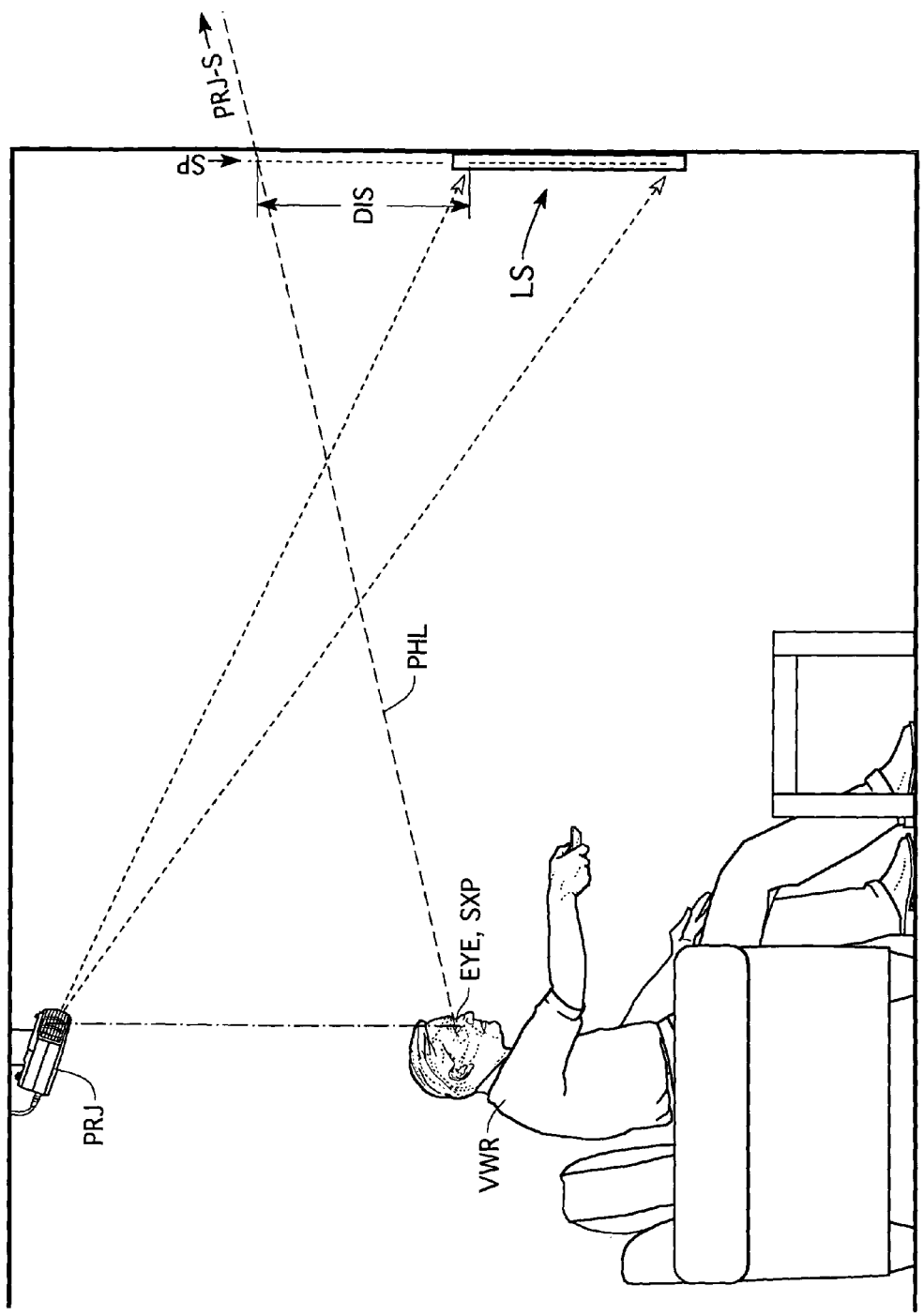
FIG. 7 is a side view of an old man, watching 3-D TV, sitting on a sofa under multiple projectors on the ceiling.
Figure 8:
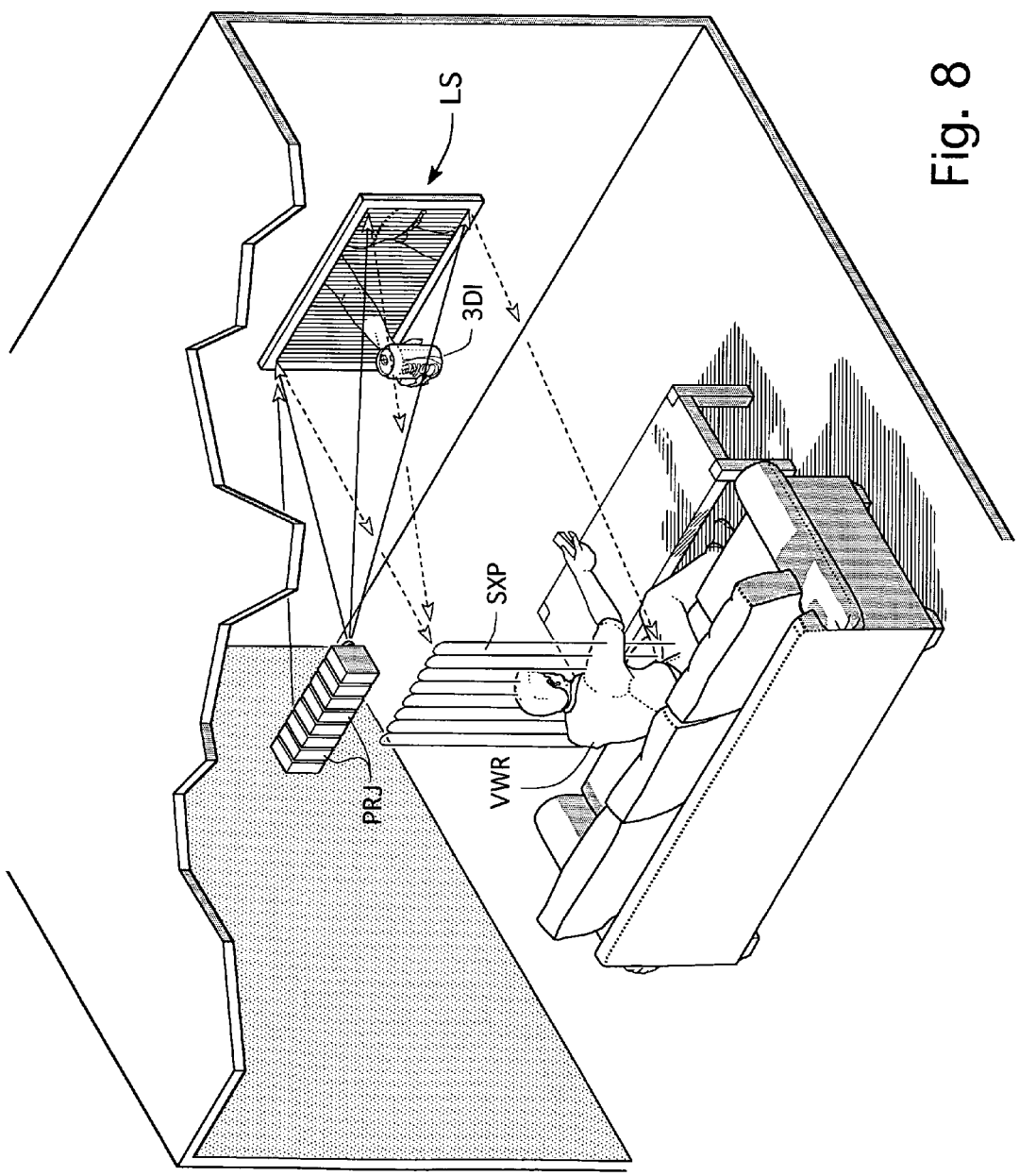
FIG. 8 is an isometric view of FIG. 7 showing the viewer under eight closely spaced ceiling-mounted projectors.
Figure 9:
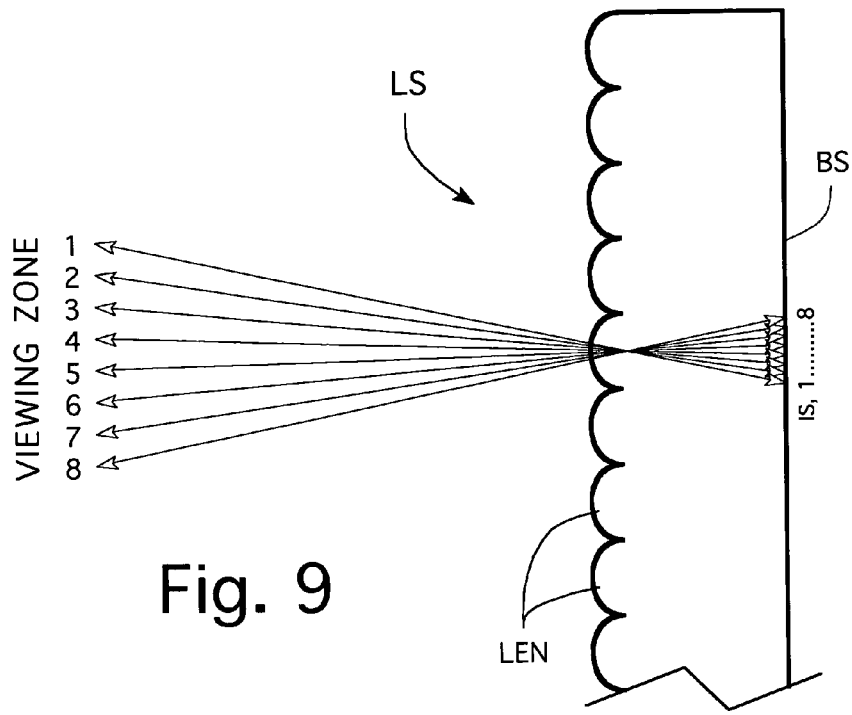
FIG. 9 is a top highly-enlarged view of a lenticular screen according to the present invention showing the central light ray from eight projectors projecting through a single lenticule and forming eight narrowly focused images on the smooth surface of the screen.
Figure 10:
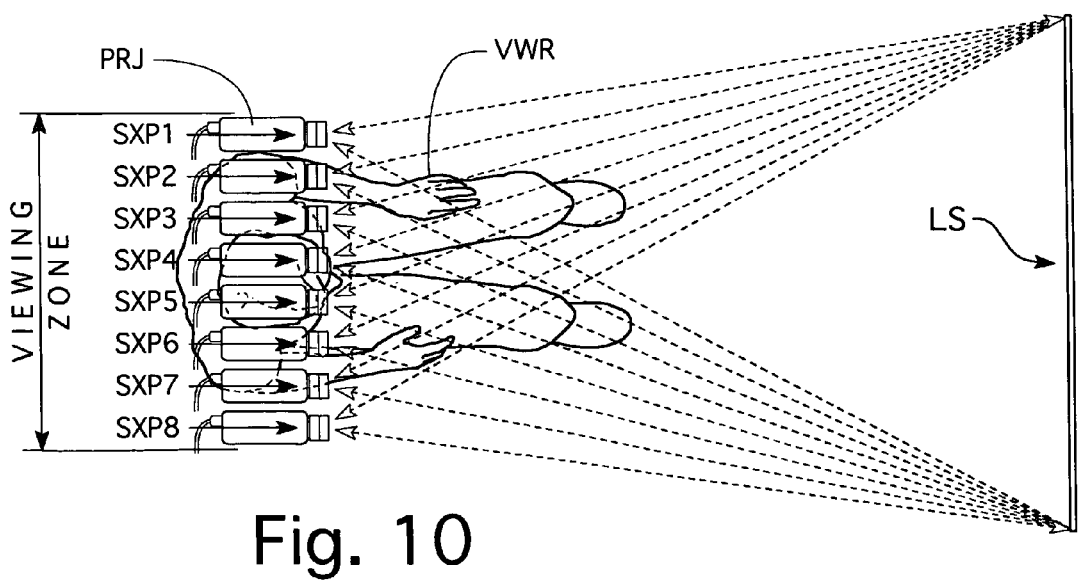
FIG. 10 is a top view of eight closely spaced projectors projecting onto a lenticular screen according to the present invention. The light is retroreflected by the screen to the projectors. The viewer is positioned under the projectors where the individual images can be seen. Using more than two projectors provides freedom of the viewing position and horizontal motion parallax.
Figure 11:
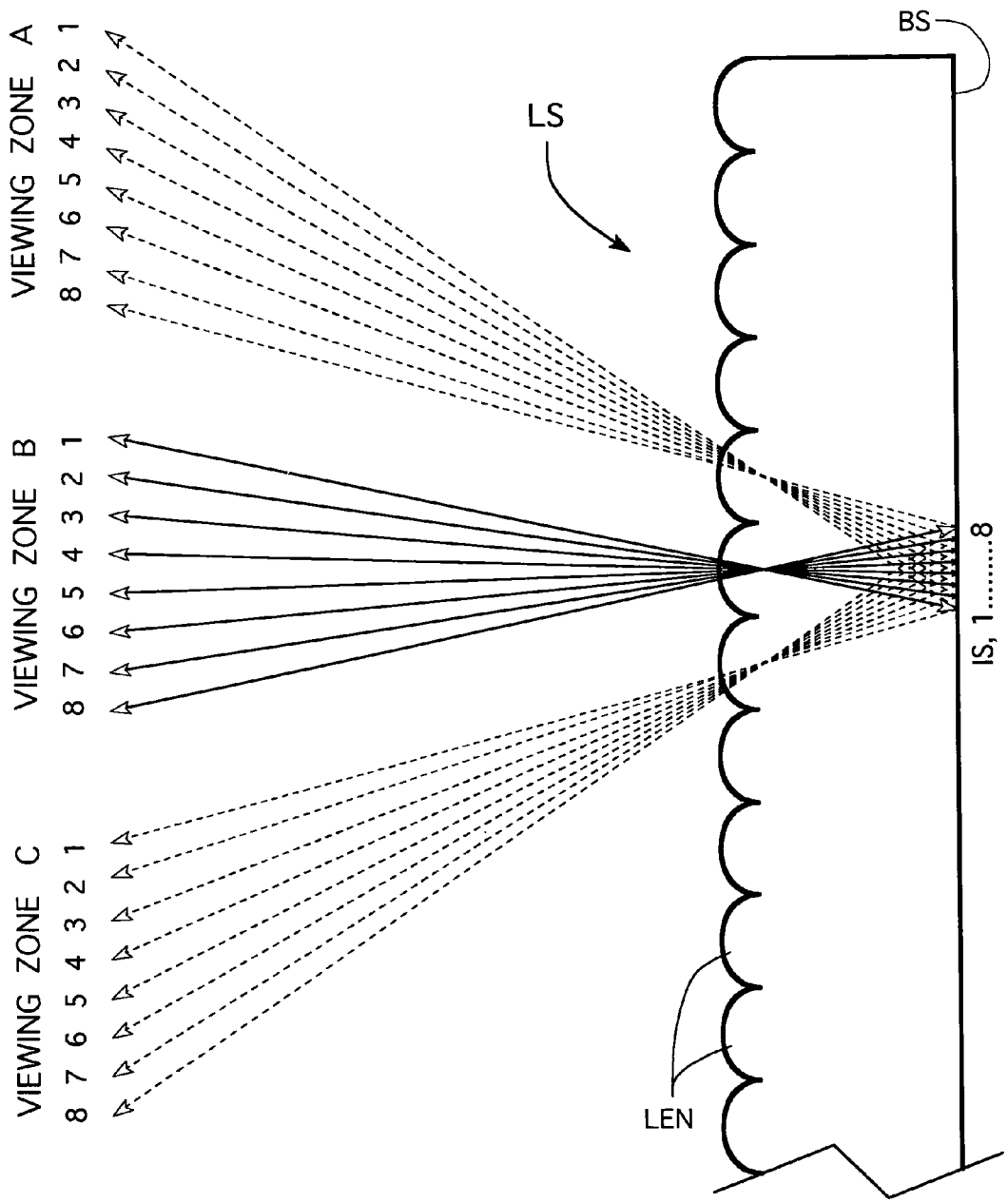
FIG. 11 is a highly enlarged top view of a lenticular screen showing light from eight centrally located projectors being projected into a lenticule, and light being retroreflected back to the projectors. Light is also being reflected and therefore projected from that same image set out adjacent lenticules to form additional viewing zones.
Figure 12A:
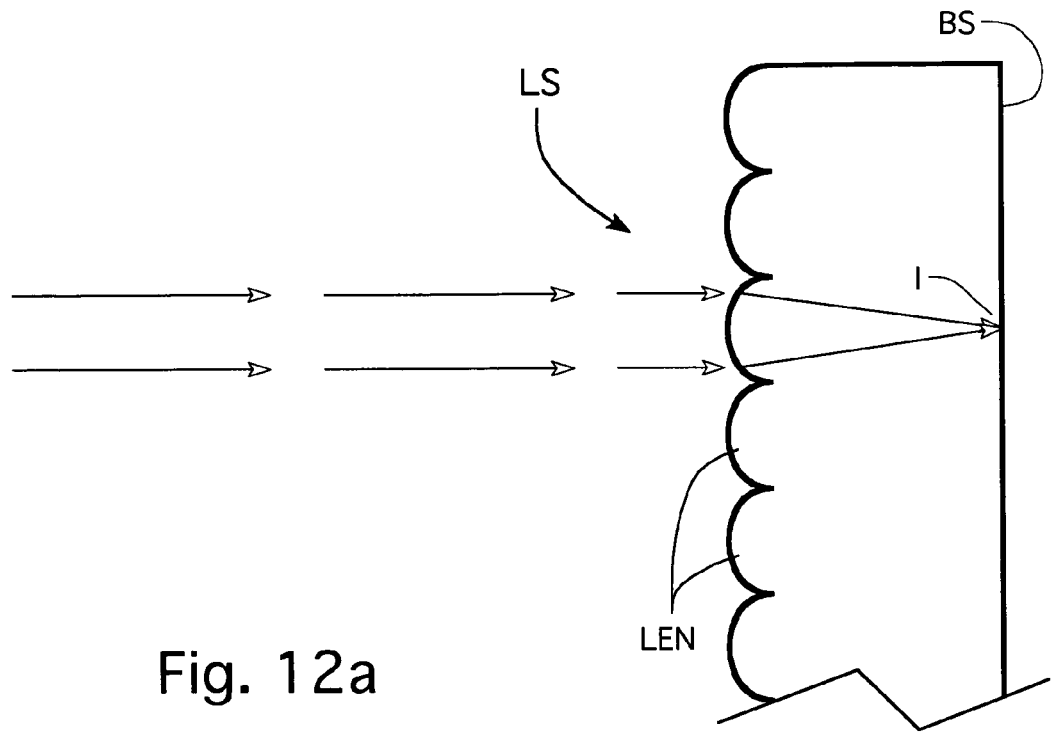
FIG. 12a shows a top view optical ray trace from a single projector into a single lenticule forming a single focused columnar image on the back side of the lenticular screen.
Figure 12B:
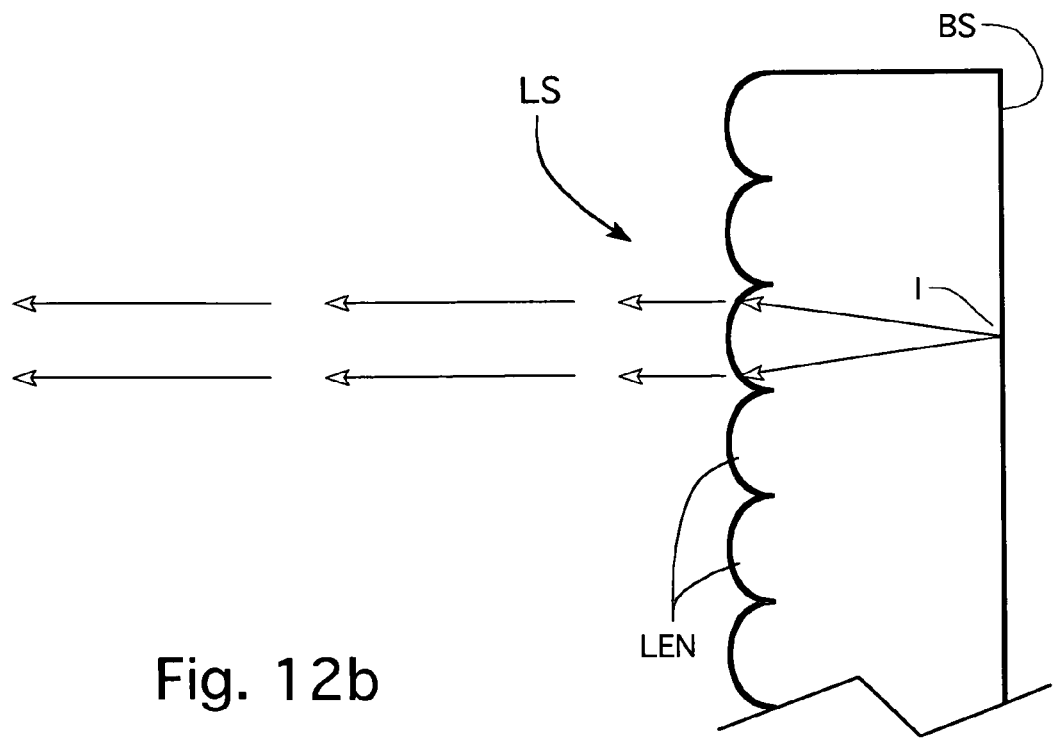
FIG. 12b shows a top view optical ray trace, from the projected image, retroreflected and therefore projected back out of the same lenticule of FIG. 12a back to the projector.
Figure 13:
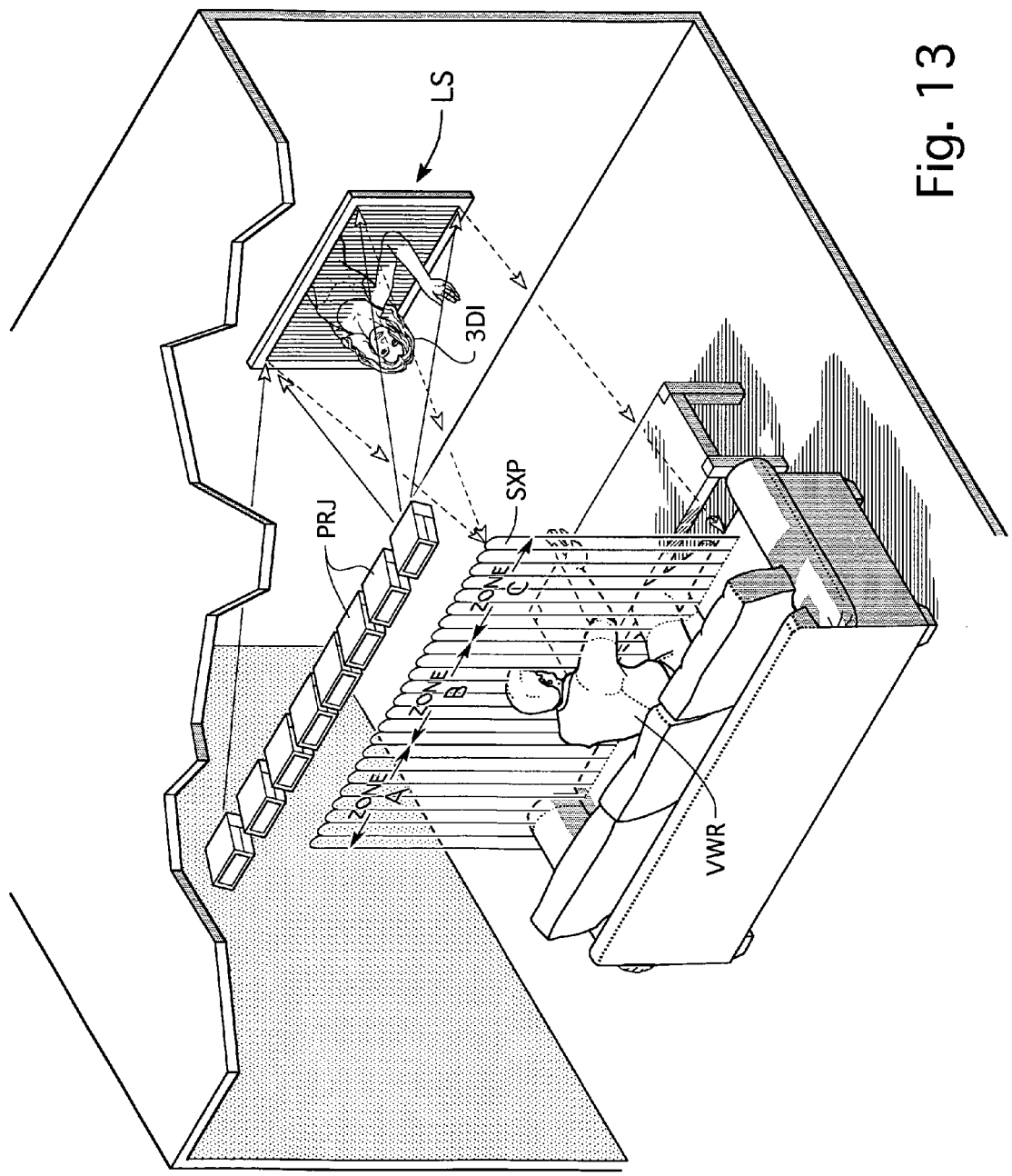
FIG. 13 is a perspective view of eight widely spaced ceiling-mounted projectors forming twenty four exit pupils distributed over three viewing zones.

Glossary:

| | |
|---|---|
| 3DI | 3-D Image, from the point of view of the viewer, FIGS. 8 and 13 |
| BS | Back Surface, FIGS. 9, 11, 12a and 12b |
| CAM | Cameras, FIGS. 4 and 5 |
| D | Door, FIG. 5 |
| DIS | Displacement of highlight from edge of Screen, FIGS. 2, 4, 6 and 7 |
| ENC | Enclosure, FIGS. 3-5 |
| EYE | Eye, FIGS. 1-4, 6, 7 and 14 |
| I | Image, FIGS. 12a and 12b |
| IS | Image Sets, FIGS. 9, 11, 16a and 17a |
| LEN | Lenticule, FIGS. 9, 11, 12a, 12b, 16-17a |
| LS | Lenticular Screen, FIG. 1-17a |
| M-EYE | Mirror-to-Eye distance, FIG. 4 |

-continued

Glossary:

| | |
|---|---|
| M-PRJ | Mirror-to-Projector distance, FIG. 4 |
| LT | Lights, FIGS. 4 and 5 |
| MIR | Mirror, FIGS. 3-6 |
| MP | Mirror Plane, FIGS. 4 and 6 |
| OBJ | Object being photographed, FIGS. 4 and 5 |
| PHL | Projector-Highlight Line, FIGS., 2, 4, 6 and 7 |
| PRJ | Projector, FIGS. 1, 2, 6, 7, 8, 10, 14, 14a-h, 15 |
| PRJ-C | Center Projector, FIGS. 3-5 |
| PRJ-L | Left Projector, FIGS. 3-5 |
| PRJ-M | Projector position reflected by Mirror, FIGS. 6 |
| PRJ-R | Right Projector, FIGS. 3-5 |
| PRJ-S | Projector position reflected by Screen, FIGS. 4, 6 and 7 |
| PRJM-C | Center-Projector position reflected by Mirror, FIGS. 3 and 4 |
| PRJM-L | Left-Projector position reflected by Mirror, FIG. 4 |
| PRJM-R | Right-Projector position reflected by Mirror, FIG. 4 |
| SP | Screen Plane, FIGS. 2, 3, 4, 6 and 7 |
| STA | Stereoscopic Attachment, FIG. 1. 2 and 6 |
| SXP | System Exit Pupils formed by light reflected by the screen toward the eyes, FIGS. 1-4, 6-10, 13-15 |
| T | Turntable, FIGS. 4 and 5 |
| VMIR | "V" Mirror, FIGS. 3-5 |
| VWR | Viewer, FIGS. 1-4, 6-8, 10, 13, 14 and 15 |

The technique of the present invention is based on the optical property that lenticular screens retro-reflect projected light back to the source. The technique involves projecting stereoscopic images, from two or more positions (dual lenses, etc.) separated horizontally by no more than an average human interocular spacing (which studies have established as being 2.5 inches), toward a lenticular screen LS which has been coated white on the smooth back side BS. The screen reflects light back to the projectors PRJ and if a viewer stands at the projectors, light reflects into the viewer's eyes to provide a stereoscopic image. (The reason for the limitation on horizontal separation is so that both of a viewer's eyes can simultaneously see the left and right images of a 3-D image. The horizontal separation can be less than the average human interocular spacing without any problem; however, if the horizontal separation is greater than the viewer's interocular spacing, the horizontal spacing will be too great for the viewer to see a 3-D image.)

The term "white" can have many different meanings, depending upon the context in which it is being used. In the context of the present invention, the smooth back side BS is coated white for the purpose of acting as an efficient projection screen and reflecting the projected image back out of the lenticules. Accordingly, in the context of the present invention, the term "nominally white" shall be used to mean a surface suitable to serve as a projection screen. Examples of "nominally white" coatings that can be used in the present invention include, but are not limited to, white paint, white ink, laminated white paper or plastic.

In the present invention's simplest form, as shown in FIGS. 1 and 2, a stereoscopic attachment STA is fitted to the front of a projector PRJ in which a single side-by-side stereoscopic image is projected from the two front windows of the stereo attachment, from slightly different angles, toward lenticular screen LS. Light which is projected from the two windows of the stereoscopic attachment is projected back out the lenticules of the lenticular screen LS to form tall columns of system exit pupils SXP at the windows of the stereoscopic attachment, STA. The viewer stands at the distance and position from the screen of the stereoscopic attachment to see separate left and right views of the 3-D image, 3DI.

Although a minimum of two images is required to create a stereoscopic image, projecting additional images creates additional system exit pupils SXP, providing lateral head freedom and horizontal motion parallax. Three projectors are shown in FIGS. 3-5; however, lenticular lens material is capable of resolving and displaying approximately eight images, providing even more motion parallax and realism.

FIG. 10 shows eight closely spaced projectors mounted to the ceiling above the viewing position. In this example, eight images are projected and superimposed on the wall-mounted lenticular screen. As in FIGS. 8 and 9, the screen retro-reflects light back to each projector. Each lenticule LEN focuses the light laterally to form a narrow stripe of image behind each lenticule. That same lenticule projects the vertical image back to the projector lens. The white coating on the back of the screen is diffuse and scattering. Because the lenticules do not focus the light vertically, only horizontally, the system exit pupils SXP formed at the projector lens are unrestricted vertically and therefore very tall. When an eye of the viewer is in any of the exit pupils, the image from the projector mounted to the ceiling above that eye, is visible.

Lenticular material is typically used for displaying 3-D post-card type photographs from images that have been interleaved, or "sliced and diced" and laminated to the back side of the lenticular plastic for later viewing. In the technique of the present invention, two or more images are projected onto the front lens side of the lenticular material for simultaneous viewing. The lenticules retro-reflect light back forming tall system exit pupils SXP at the lens. When the viewer places an eye in any of the vertical system exit pupils SXP, the image, projected by the corresponding projector, can be seen by the eye across the entire lenticular screen LS.

As seen in FIG. 11, additional viewing zones A and C are created by the images being simply reflected (not retroreflected as in viewing zone B) and projected out of neighboring lenticules. Taking advantage of this, images can be projected into the lenticules from adjacent viewing zones, as in FIGS. 13 and 14, to more conveniently position the projectors, and to improve cooling. This creates the optical equivalence of the projectors being spaced apart laterally by no more than 2.5 inches. This is very advantageous due to the projectors being wider than 2.5 inches, otherwise causing physical interference.

For the sake of visual clarity, FIG. 11 shows only the central optical rays from each of eight projectors in viewing zone B; being projected into a single lenticule, and retroreflected out of the same lenticule back to the projectors. However, a more accurate ray trace is shown in the top view of the lenticular screen in FIG. 12a where light is projected from a single projector, not shown, into a lenticule LEN which focuses the light down to a single vertical columnar image I, shown as a point in this top view drawing. FIG. 12b shows the same enlarged portion of a lenticular screen as in FIG. 12a with the light from that narrow image I being reflected back toward the lenticule and retroreflected back to the projector. FIGS. 12a and 12b show light from only a single projector being focused by only a single lenticule; however, the optical ray traces in FIGS. 12a and 12b represent the situation for all projectors projecting light into all lenticules, and also reflecting light out of adjacent lenticules as in FIG. 11 forming adjacent viewing zones.

One problem that has plagued viewing lenticular 3-D pictures has been the reflections on the edges of each of the thousands of vertical lenticules. This typically causes distracting reflections of ambient lights across the face of the picture. No amount of left-right angling of the photograph eliminates the surface reflection because each vertical lenticule is curved so steeply that it catches light from all sides. In the technique of the present invention, these distracting reflections are eliminated by projecting the multiple images from far enough above or below the lenticular screen so that the reflection, from the point of view of the observer, does not fall within the picture area.

Figure 14:
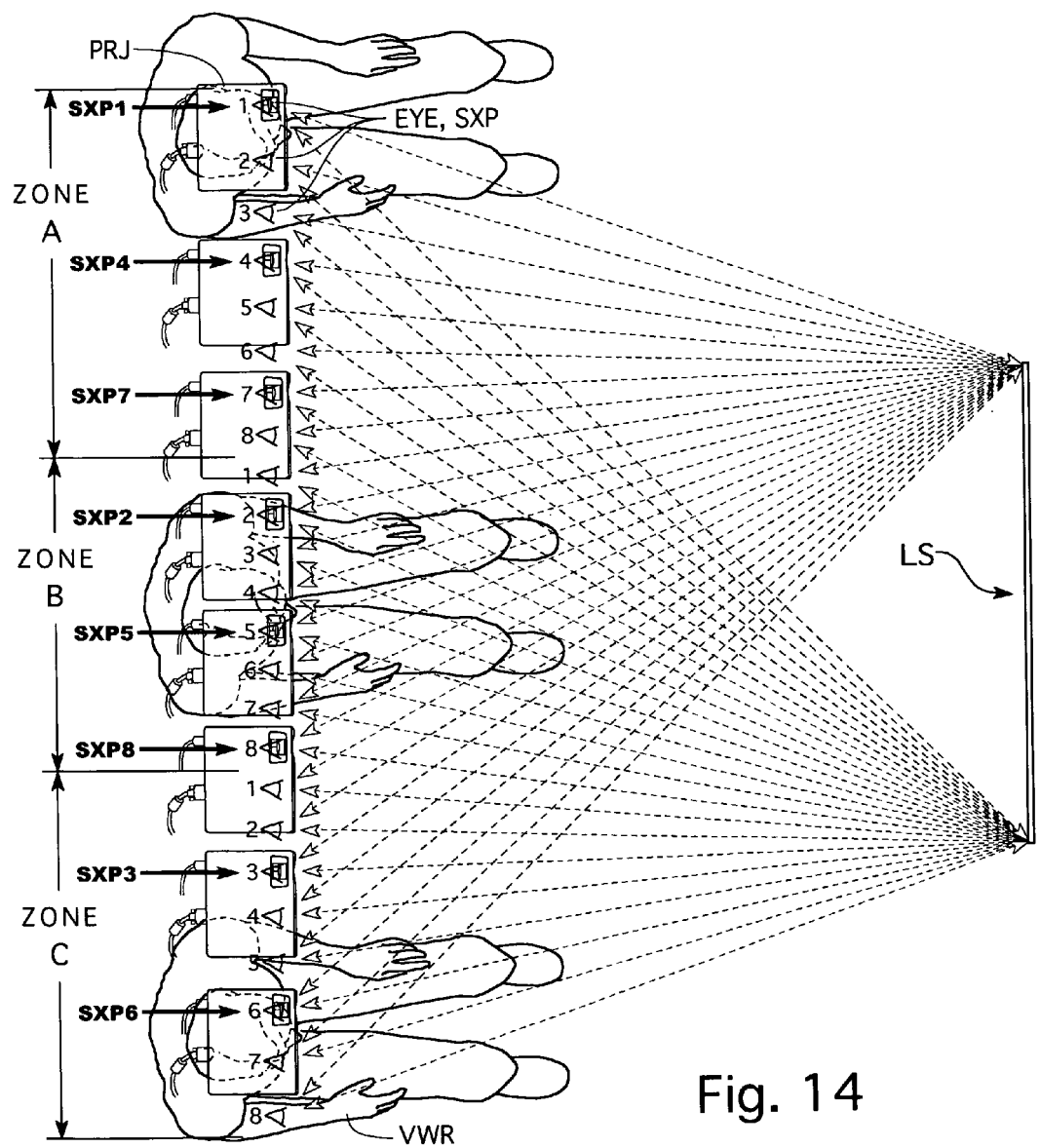
FIG. 14 is a top view of FIG. 13, showing eight ceiling-mounted projectors forming twenty four exit pupils in three viewing zones, for people seated below the projectors.
Figure 14A:
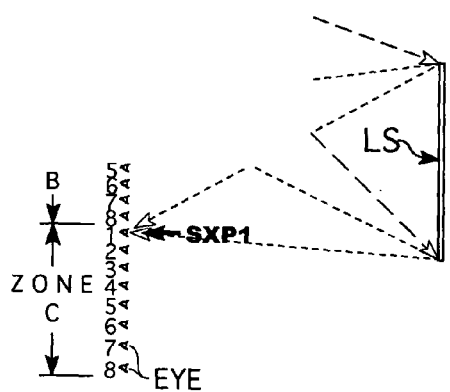
FIGS. 14a-h are detailed specific examples of each of eight projectors showing how three exit pupils are created for each projector, as taught in FIGS. 11 and 14.

The projector PRJ in FIG. 6 is shown fitted with a stereoscopic attachment STA; however, side-by-side projectors can be used as in FIG. 10 or 14. The smaller lenticular computer screen in FIG. 6 can be adequately illuminated using less-expensive LED projectors, for example the Samsung SP-P400, Boxlight Bumblebee, Toshiba Pocket projector, or other models from Epson, Mitsubishi, Sony, Toshiba, and Viewsonic, or the Microvision PicoP pocket laser projector.

The vertical position of the projectors is determined, taking into account the vertical position of the eyes of the tallest expected viewer, and knowing that the lenticular material, which is inherently reflective, acts somewhat like a mirror. As shown in FIGS. 2, 4, 6 and 7 a projector-highlight line PHL is drawn from the position of the tallest viewer's eyes to the reflected position of the projector PRJ-S, as if reflected behind the lenticular screen LS by the lenticular screen material. This PHL line intersects the screen plane SP at a point where a highlight, or reflection, would occur if the screen were large enough. By shifting the lenticular screen LS vertically from that highlight, the annoying reflection is avoided.

Typically, 35 mm slide projectors, and motion-picture theater projectors, are aimed perpendicular to the center of the screen, in which case the projected image is automatically rectangular. However, as shown in FIGS. 2, 4, 6, and 7, the present invention proposes to project the image from a position above or below the center of the screen to eliminate the reflection on the surface of the lenticular screen LS, and to optically or digitally compensate for the keystone image that results from the off-axis projection. Video projectors are typically designed with an upward projection angle so that the image does not project on the supporting table. The technique proposed here takes advantage of this upward optical shift of the projected image (FIGS. 2, 4, 6 and 7), and further makes use of digital keystone correction to allow the multiple projectors to be staggered vertically for improved cooling (FIGS. 4 and 5), using mirrors to maintain a 2.5 inch optically equivalent maximum lateral displacement of the projector lenses. Optical and/or digital keystone correction can be used to make all images rectangular and to register on the screen.

Figure 16:
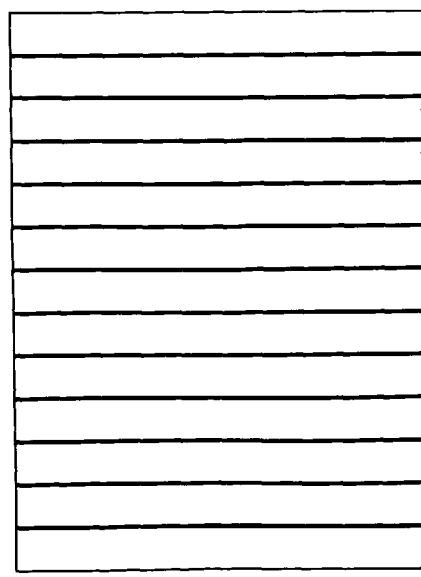
FIG. 16 is an enlarged portion of an ideal lenticular screen with straight lenticules.
Figure 16A:
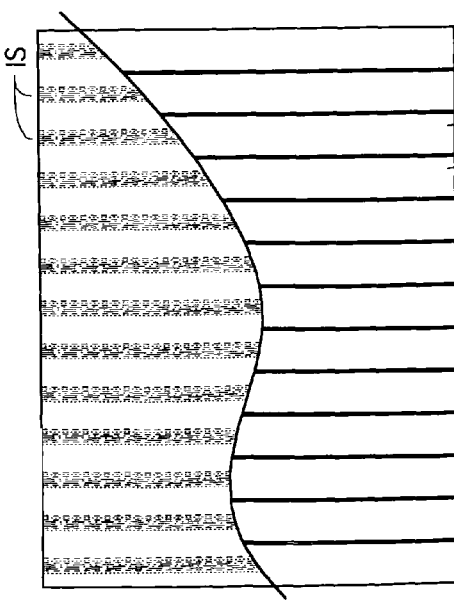
FIG. 16a is a partial cutaway of the lenticular screen of FIG. 16, showing straight lenticules cut away to reveal eight narrowly focused images behind those lenticules.

A problem plaguing manufacturers of laminated 3-D lenticular pictures, and 3-D post cards, etc., has been image registration between the lenticules and the printed images laminated to the back surface BS. For that application, all lenticules need to be straight and parallel as shown in FIG. 16 so that they register with the interleaved images IS as shown in FIG. 16a which is a partial cutaway of the lenticules LEN and eight narrow images comprising image sets IS, on the back surface BS.

The problem has been accurately making large plastic lenticular lens panels due to the plasticity of the material while cooling and shrinking after the casting or calendaring process. The larger the lens material, the more chance of warping in the corners, leading ultimately to mis-registration in the corners. Rarely are 3-D pictures made larger than 16×20 inches, simply because of the lenticular panel warping during cooling.

To achieve a 3-D video image using lenticular screens, several companies laminate the lenticular screen directly to the face of a digital video display (LCD or Plasma); however, the registration requirements are equally critical compared to laminating the lenticular screen to printed pictures for 3-D post cards and other lenticular 3-D pictures. Because the LCD and Plasma displays used for lenticular 3D are made with an image resolution suitable for direct 2-D viewing, when alternate columns of pixels are used for left and right stereo images, the horizontal resolution is reduced to half. Further, if more than two columns of pixels are used behind each lenticule, to provide multiple exit pupils and horizontal motion parallax, the horizontal image resolution is reduced even more. These past attempts to create 3-D video images have had the horizontal resolution reduced in proportion to the number of 3-D views, for example:

TABLE 1

| Number of Views | Horizontal Image Resolution Reduction |
|---|---|
| 2 | ½ |
| 3 | ⅓ |
| 4 | ¼ |
| x | 1/x |

Others in the past have proposed using two lenticular screens back to back with a thin rear-projection screen in between. Conceptually, this approach is possible; however, distortions in both screens compound the registration problem. Both lenticular screens would need to be essentially perfect, and perfectly rotationally registered with respect to each other in order for the second screen to unscramble the interleaved images of the first screen. Any warping in either lenticular screen would destroy the overall image.

The horizontal image resolution in the system of the present invention is not reduced by the number of views (or projectors), but rather is limited only by the resolution of the video projectors and the pitch of the lenticular screen which is available from approximately 10 to 300 lenticules per inch. The pitch of the lenticular screen is chosen for each application to be smaller than would be discernable by the viewer VWR, therefore the entire lenticular screen appears to be a single smooth surface. Future advancements in the resolution of video projectors will only enhance the overall image resolution using this front-projection technique, and even of an existing lenticular screen.

Figure 17:
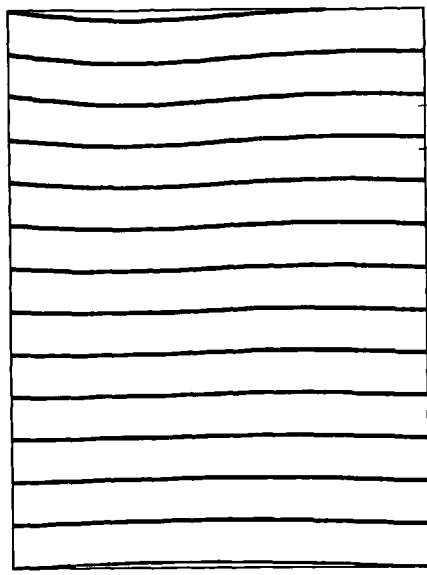
FIG. 17 is an enlarged portion of a lenticular screen with an exaggerated amount of warping.
Figure 17A:
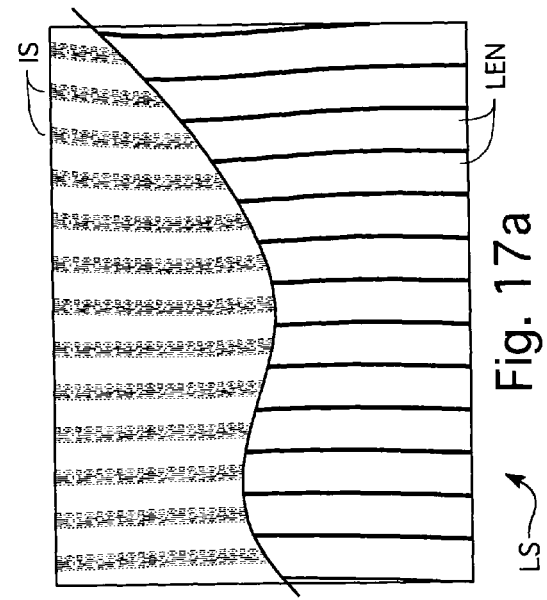
FIG. 17a is a partial cutaway of the lenticular screen of FIG. 17, showing warped lenticules cut away to reveal eight narrowly focused images that follow the warping of those lenticules.

FIG. 17 shows a highly magnified and highly exaggerated portion of a warped lenticular screen LS of FIG. 5. FIG. 17a is a partial cutaway of distorted lenticules, and the equally distorted images comprising image sets IS formed by those lenticules using this projection technique. Whereas subtle distortion of the lenticular screen would destroy image registration in a conventional laminated photograph; however, using this projection technique, even the exaggerated distortion in FIG. 17 would cause no problem because the images are formed by the lenticules and therefore follow the curve of the lenticules if distorted, and where the images are in the proper position to be retroreflected out through that same lenticule to the viewer. This automatic compensation technique circumvents the registration problems of printed pictures laminated to the back of lenticular lens material.

Further, in comparison to others which laminate a single lenticular screen to a flat video display, or rear project onto back-to-back lenticular screens, in which rotational registration is critical, in this proposed front projection technique, rotational registration issues are also eliminated.

Although not as optically efficient, or bright, the lenticular screen described hereto in this patent application can be substituted with a raster barrier screen, typically vertical black stripes on film laminated to the front of a clear plastic or glass panel which is painted with a reflective paint on the back side. The raster panel would act in all respects like the lenticular screen, other than the reduced brightness. The efficiency is calculated with the duty cycle of the raster screen times the reflectivity of the back surface, i.e. for example if using eight images and a white backing of 25% reflectivity: ⅛×25%=3%.

FIG. 11 shows a highly magnified top view of the lenticular screen LS, with light from eight projectors, in viewing zone B, being projected at each lenticule from slightly different lateral positions (light is shown being projected into only one lenticule, for simplicity). Light is returned, or retro-reflected, back to the projector positions in viewing zone B along the same lines. Light also "leaks out" or is projected out of, or is visible through, adjacent lenticules to form additional viewing zones A and C, allowing more people to see the picture simultaneously, as shown in FIGS. 11, 13 and 14. As many as five to seven viewing zones typically are created by image sets IS being projected out of neighboring lenticules; however, for simplicity, a total of only three viewing zones are illustrated in FIGS. 11, 13, 14, 14a-h and 15.

Ceiling-mounted projectors PRJ are shown in FIGS. 1, 2, 7, 8, 10, 13, 14 and 15. Rather than the viewer being at the same distance from the screen as the projectors and below the projectors, a mirror MIR can be used to reflect the position of the actual projector so that the projector is at the optically equivalent distance of the viewer. The use of this folding mirror allows the design of a compact retail advertising display as in FIGS. 3-5, or computer desk in FIG. 6.

Additional mirrors, VMIR, can be used to fold the optical path so that projectors physically clear each other, as in FIGS. 3-5; however, create the effect of the projection lenses being 2.5 inches apart. Use of the VMIR also allows the projectors to be vertically staggered which improves cooling. Optical and/or digital keystone correction is used to compensate for the projectors being at different heights make all images rectangular and registered.

Figure 14B:
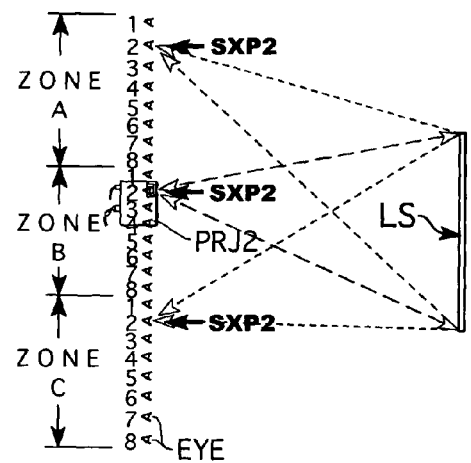
Figure 14C:
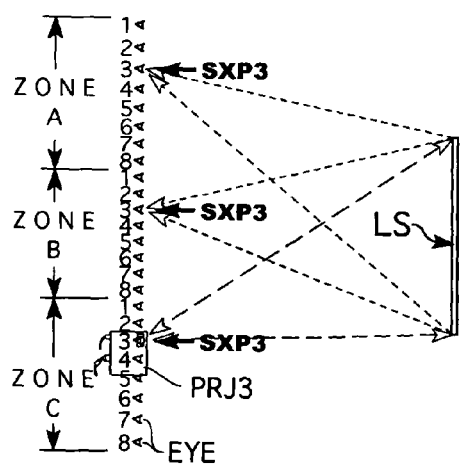
Figure 14D:
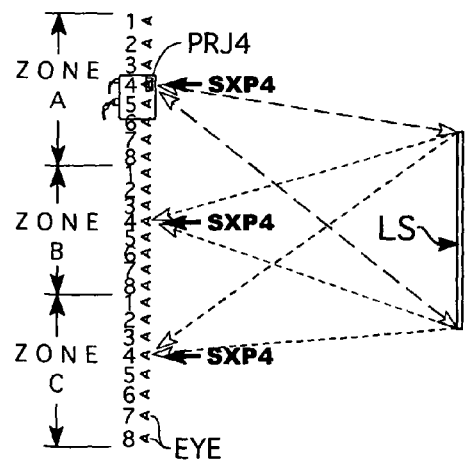
Figure 14E:
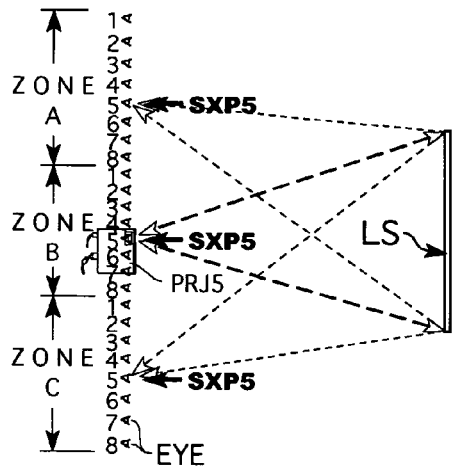
Figure 14F:
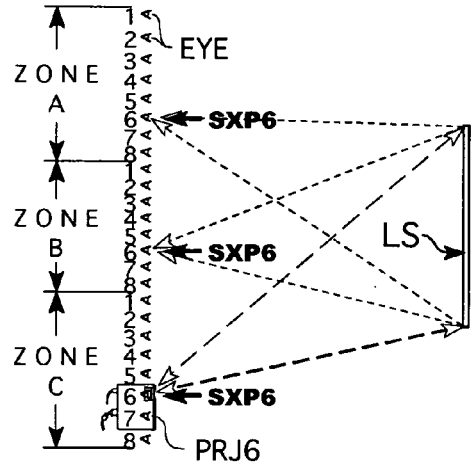
Figure 14G:
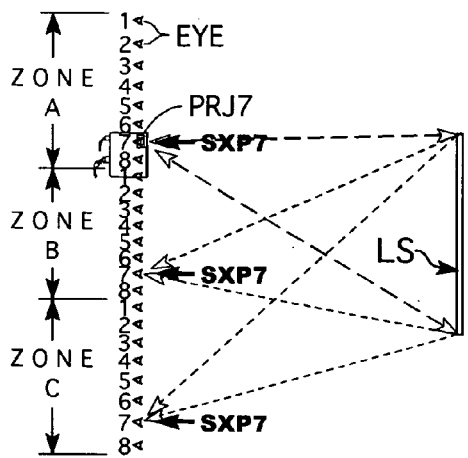
Figure 14H:
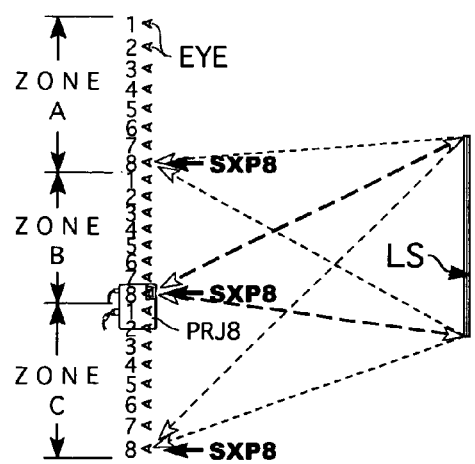
Figure 15:
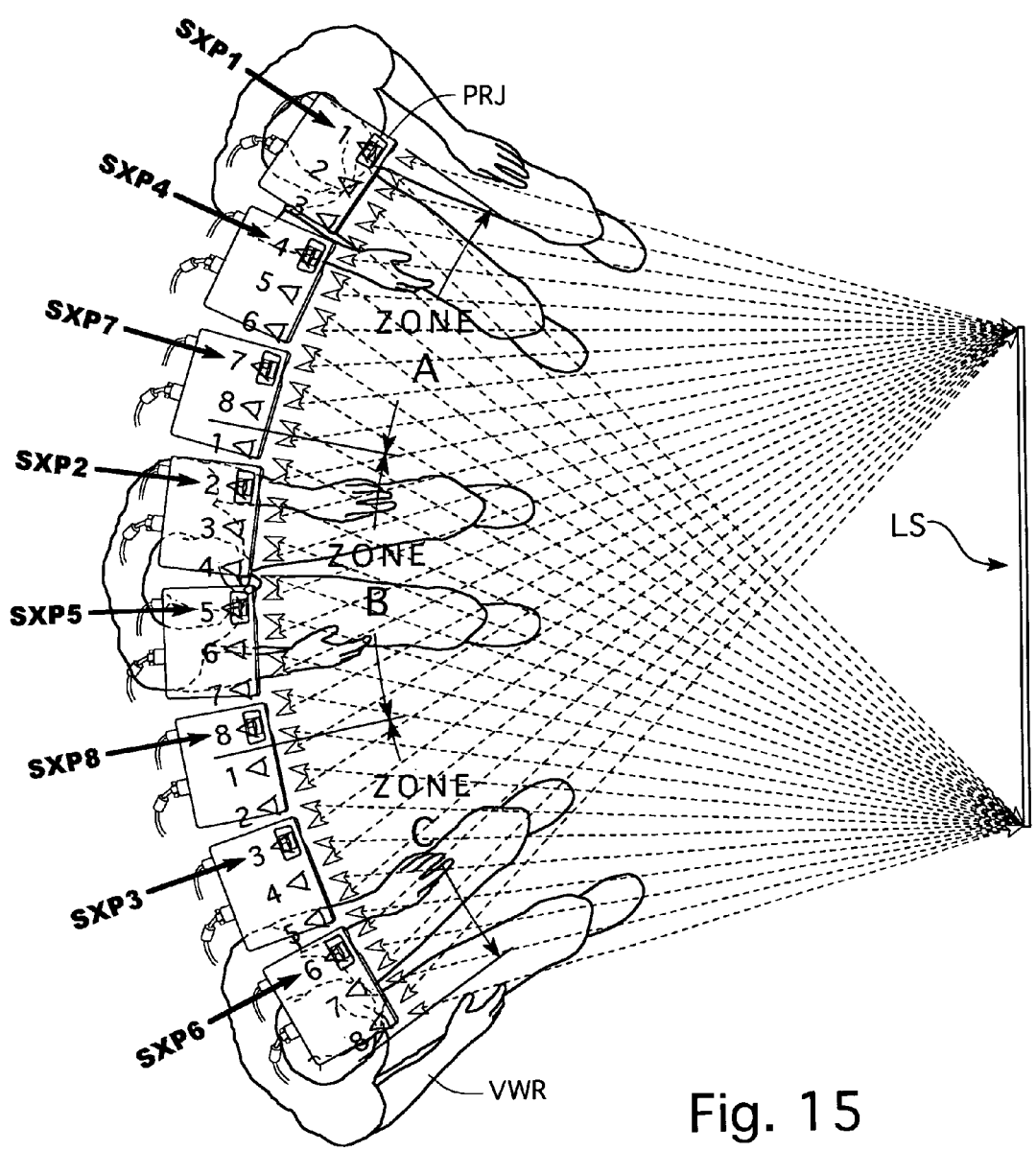
FIG. 15 is a top view, similar to FIG. 14, however showing eight projectors arranged in an arc, while also creating twenty four exit pupils in three viewing zones, for people seated below the projectors

FIGS. 11, 14 and 15 show eight images, one each from eight projectors reflected by lenticular screen LS to twenty four system exit pupil positions SXP, distributed over three viewing zones, eight images in each zone. It can be seen that it is not necessary to have all eight projectors crowded into the space of one viewing zone, as in FIGS. 8 and 10. FIGS. 14a-h show projectors for each of eight images projecting those images onto the lenticular screen LS, which retroreflects light back to the positions of the lenses, and also reflects light to form adjacent reflected exit pupils SXP to corresponding eye positions.

As example, in FIGS. 14 and 14b, the projector's light which projects image number 2 onto the lenticular screen LS not only retroreflects back to the projector PRJ2 in viewing zone B to form a system exit pupil SXP2, but light is also projected out of neighboring lenticules, as in FIG. 11, to form #2 system exit pupils SXP2 in adjacent viewing zones A and C. As further example, in FIGS. 14 and 14c, image number 3 is projected onto the lenticular screen. Light is not only retroreflected back to the position of the lens of the projector PRJ3 in viewing zone C but also forms adjacent system exit pupils SXP3 in viewing zones A and B. Taken collectively, eight projectors PRJ in FIGS. 14a-h form twenty four system exit pupils SXP, eight each in viewing zones A, B and C as in composite drawing FIG. 14.

The ability of the projector lenses to project over such a wide angle or to shift laterally for horizontal keystone correction, in addition to the vertical shift for vertical keystone correction, places great demands on the optical design of the projector lenses. Use of narrow, vertical projectors eases the packaging requirements.

FIG. 15 shows eight video projectors; however, arranged in an arc. Fanning the projectors around so that each aims directly at the center of the screen relaxes the optical requirements of the projector lenses required in the linear arrangement of FIG. 14.

The projectors must be supplied with signals from an equal number of video cameras in a corresponding arrangement to create a 3-D image 3DI, as in FIGS. 8 and 13 with motion parallax.

The retail advertising display, in FIGS. 3 and 5, shows the enclosure's interior space used to house video cameras CAM, lights LT and a product turntable T, on which an object OBJ can be placed. A lockable access door D in FIG. 5 allows the merchant to change products being displayed. The same enclosure can house alternate video sources such as a VCR, DVD player, a computer, or internet access equipment which would allow a remote operator to change the 3-D image.

In the case of the lenticular screen used for a computer display in FIG. 6, the Matrox Corporation makes the PPX-OUT4 and the PPX-OUT8 computer board controller for supplying up to four or eight synchronized video images, res. to the video projectors. Both computer boards supply resolutions of 800×600, 1024×768, 1280×1024 or 1400×1050 resolution to match a wide variety of resolutions of video projectors.

While the invention has been described herein with reference to certain preferred embodiments, those embodiments have been presented by way of example only, and not to limit the scope of the invention. Additional embodiments and further modifications are also possible in alternative embodiments that will be obvious to those skilled in the art having the benefit of this detailed description.

Accordingly, still further changes and modifications in the actual concepts described herein can readily be made without departing from the spirit and scope of the disclosed inventions as defined by the following claims.

What is claimed is:

1. A method for providing a three-dimensional ("3-D") image without requiring 3-D glasses, comprising:
projecting two or more images having projected exit pupils separated horizontally by no more than approximately an average human interocular spacing upon a 3-D forming screen with a substantially smooth and nominally white back side and a front side having a plurality of individual vertical elements that project left and right images into a viewing zone to provide the 3-D image;
wherein the 3-D forming screen retro-reflects projected light from a light source back to the light source.

2. The method of claim 1, wherein retro-reflection from the 3-D forming screen forms tall system exit pupils from which the projected images are visible across the entire 3-D forming screen.

3. The method of claim 2, wherein the two or more images are projected from sufficiently above or below the 3-D forming screen so that reflections on edges of the plurality of individual vertical elements do not reflect into the viewing zone, the 3-D forming screen is shifted vertically so that a projector-highlight line drawn from a position of a preselected tallest viewer's eyes to a reflected position of a projector used to project the two or more images as if reflected behind the 3-D forming screen does not intersect the 3-D forming screen, and the two or more images are projected from a position vertically off axis of the 3-D forming screen with a keystone correction.

4. The method of claim 3, wherein a first projector is used for projecting at least a first image and a second projector is used for projecting at least a second image.

5. The method of claim 4, wherein at least one mirror is used to fold an optical path of the second projector and create the effect that the first and second images have projected exit pupils separated horizontally by no more than approximately the average human interocular spacing.

6. The method of claim 1, wherein the two or more images are projected from sufficiently above or below the 3-D forming screen so that reflections on edges of the plurality of individual vertical elements do not reflect into the viewing zone.

7. The method of claim 1, wherein at least one additional projector is used for projecting additional images having projected exit pupils separated horizontally by no more than approximately the average human interocular spacing onto the 3-D forming screen.

8. The method of claim 7, wherein the at least one additional projector is used for providing additional parallax and realism in the viewing zone.

9. The method of claim 1, wherein the 3-D forming screen is shifted vertically so that a projector-highlight line drawn from a position of a preselected tallest viewer's eyes to a reflected position of a projector used to project the two or more images as if reflected behind the 3-D forming screen does not intersect the 3-D forming screen.

10. The method of claim 1, wherein at least two additional adjacent viewing zones provide the 3-D image due to reflections from a plurality of adjacent vertical elements of the plurality of vertical elements.

11. The method of claim 1, wherein two or more images are projected from a position vertically off axis of the 3-D forming screen with a keystone correction.

12. The method of claim 11, wherein the keystone correction is an optical keystone correction.

13. The method of claim 11, wherein the keystone correction is a digital keystone correction.

14. The method of claim 1, comprising the further step of: viewing the 3-D image from within the viewing zone while the two or more images are being projected upon the 3-D forming screen.

15. The method of claim 14, wherein the viewing zone is at a first distance from the 3-D forming screen, a projector used to project the two or more images is at a second distance from the 3-D forming screen, and the first and second distances are substantially the same.

16. The method of claim 14, wherein the viewing zone is at a first distance from the 3-D forming screen, a projector used to project the two or more images is at a second distance from the 3-D forming screen, and the first and second distances are not substantially the same but the second distance is substantially the same optically equivalent distance as the first distance through use of at least one mirror.

17. The method of claim 1, wherein a first projector is used for projecting at least a first image and a second projector is used for projecting at least a second image.

18. The method of claim 17, wherein at least one mirror is used to fold an optical path of the second projector and create the effect that the first and second images have projected exit pupils separated horizontally by no more than approximately the average human interocular spacing.

* * * * *